United States Patent
Hirayama et al.

(10) Patent No.: US 6,179,358 B1
(45) Date of Patent: Jan. 30, 2001

(54) MOBILE HOSPITAL SYSTEM

(75) Inventors: Kensuke Hirayama; Nobuhiko Hirota, both of Yamato (JP)

(73) Assignee: Hirayama Setsubi Kabushiki Kaisha, Kanagawa (JP)

( * ) Notice: Under 35 U.S.C. 154(b), the term of this patent shall be extended for 0 days.

(21) Appl. No.: 09/184,048

(22) Filed: Nov. 2, 1998

(30) Foreign Application Priority Data

Mar. 3, 1998 (JP) .................................................. 10-50761
Mar. 3, 1998 (JP) .................................................. 10-50762

(51) Int. Cl.[7] .................................................. B60P 3/05
(52) U.S. Cl. ................................. 296/24.1; 52/36.1
(58) Field of Search ............................... 296/24.1; 52/36.1

(56) References Cited

U.S. PATENT DOCUMENTS

| | | | |
|---|---|---|---|
| 3,694,023 | * 9/1972 | Burgess | 296/24.1 |
| 3,705,743 | * 12/1972 | Tiimey | 296/24.1 |
| 4,556,247 | * 12/1985 | Mahaffey | 298/24.1 |
| 4,925,435 | * 4/1990 | Levine | 296/24.1 |
| 5,236,390 | * 8/1993 | Young | 296/24.1 |
| 5,398,986 | * 3/1995 | Koob | 296/24.1 |
| 5,507,122 | * 4/1996 | Aulson | 296/24.1 |
| 5,727,353 | * 3/1998 | Getz et al. | 296/34.1 |
| 5,755,478 | * 5/1998 | Kamiya et al. | 296/34.1 |
| 5,755,479 | * 5/1998 | Lavin et al. | 52/36.1 |
| 5,775,758 | * 7/1998 | Eberspacher | 296/24.1 |
| 5,833,295 | * 11/1998 | Farlow | 296/24.1 |

FOREIGN PATENT DOCUMENTS

| | | | |
|---|---|---|---|
| 3201672 | * 9/1983 | (DE) | 296/24.1 |
| 0278626 | * 8/1988 | (EP) | 296/24.1 |
| 0465284 | * 1/1992 | (EP) | 296/24.1 |

OTHER PUBLICATIONS

Calumet Coach—Specialized Mobile Units, 1966.*
MOEX—Mobole Health Clinics.*
Mobile Tech Inc.—Speciality Vehicles, 1984.*

* cited by examiner

Primary Examiner—Joseph D. Pape
Assistant Examiner—Kiran Patel
(74) Attorney, Agent, or Firm—Oliff & Berridge, PLC (57) ABSTRACT

A mobile hospital system can be moved by tractors, helicopters, railway locomotives and/or sea vessels and provide comprehensive diagnoses and medical treatments to casualties and patients. A plurality of container wagons functionally operate as part of a hospital and are moved appropriately to set up a comprehensive hospital system by connecting the plurality of container wagons on site, some of the container wagons being supplied with water, power and fuel oil from a water supply wagon, a power generation wagon and an oil supply wagon, respectively. With such an arrangement, a comprehensive hospital system can be set up by connecting the plurality of container wagons on site in a region hit by a natural disaster or a harsh military dispute so that it can provide relevant medical services to a large number of patients including causalities.

10 Claims, 10 Drawing Sheets

MOBILE HOSPITAL SYSTEM

BACKGROUND OF THE INVENTION

1. Field of the Invention

This invention relates to a mobile hospital system adapted to quickly provide comprehensive diagnoses and medical treatments to a relatively large number of patients in an area stricken by a large natural disaster or a harsh military dispute or in an extremely remote area where medical facilities are not available.

2. Prior Art

A large number of casualties can be given rise to in areas hit by devastating natural disasters such as earthquakes, floods caused by a prolonged rain fall or volcanic eruptions and the hospitals in the neighboring areas may normally have only a limited capacity for diagnoses and medical treatments so that many of the patients may be left uncared-for. If large hospitals are found in the neighboring areas. They may find themselves hopeless in providing medical care to the patients when the services of public utilities including the supply of electricity, water and fuel gas are disrupted.

When a large natural disaster occurs, medical tents are normally set up as appropriate locations near the disaster-stricken area and attended by doctors ad nurses, who provide medical care to casualties on a first aid basis, the hardest-hit having the highest priority of treatment. However, the medical staff will then have to take care of a large number of patients with limited staff members and therefore many of the patients will not be adequately treated. Additionally, the patients who need long term medical care will have to be moved to a hospital remote from the disaster-stricken are if no medical facilities are available in nearby areas to accommodate the patients.

In countries at war, medical aid will be provided typically by the international Red Cross so that wounded soldiers may be moved to casualty clearing stations while wounded civilians may be sent to emergency medical facilities for medical treatment. However, as pointed out above, the medical care provided by these facilities are mostly on a first aid basis and they may not be adapted to sophisticated surgical operations because they are not medically equipped in a sufficient and satisfactory fashion.

As described above, in areas stricken by a large natural disaster or a harsh military dispute or in an extremely remote area, many patients who need medical care are left without being sufficiently taken care of because of insufficient medical staff and medical facilities particularly when a large number of patients are produced. Thus, patients who are not seriously wounded can eventually a suffer from chronic diseases and after-effects of diseases because their diseases are not completely cured, although then could be satisfactorily cured if the patients were medically treated in a satisfactory fashion. Therefore, there is a strong need for hospital facilities that can cope with a situation where a large number of patients are produced by a disaster.

Thus, in view of the above identified problem, it is therefore the object of the invention to provide a mobile hospital system that can be moved by means of tractors, helicopters, railway locomotives and/or sea vessels and adapted to provide comprehensive diagnoses and medical treatments to causalities and patients having various symptoms.

SUMMARY OF THE INVENTION

According to a first aspect of the invention, the above object is achieved by providing a mobile hospital system comprising a plurality of container wagons adapted to functionally operate as part of a hospital and be moved appropriately by transportation means including tractors and helicopters so as to be able to set up a comprehensive hospital by connecting the plurality of container wagons on site, some of the container wagons being provided with a water supply means for supplying water, a power generation means for supplying electric power and an oil supply means for supplying fuel oils to the power generation means.

Preferably, each of the plurality of container wagons has a connecting opening at least on one of its four lateral sides so that any adjacently located two of the container wagons may be held in communication with each other by way of their respective connecting openings.

Preferably, the plurality of container wagons include at least a consulting room for treatments by a doctor, a surgical operation room for surgical operations and a medical instrument room equipped with various medical instruments.

Desirably, the surgical operation room is provided with an air cleaning apparatus for keeping it as clean room.

If the surgical operation room is provided with an air cleaning apparatus, it has an air duct arranged above the ceiling of the room and the ceiling has a plurality of air blow-in holes held in communication with the air duct, the air cleaning apparatus being adapted to draw air from a lower portion of the surgical operation room and blow in clean air to the air duct.

Desirably, the plurality of container wagons further include a ward, a canteen, a staff room and a staff bed room.

Preferably, at least one of the container wagons is airtightly sealed and isolated from ambient air.

Preferably, a mobile hospital system according to the invention further comprises a water purifying apparatus for purifying the natural water caught by it to the quality level of drinking water.

Still preferably, a mobile hospital system according to the invention further comprises an incinerator for burning the wastes produced from the container wagons.

Still preferably, for a mobile hospital system according to the invention, rails are laid sequentially in the intended area of operation for railroads and the container wagons are moved to the setup site by locomotives, where the container wagons on the rails are connected with each other to set up the hospital system.

Preferably, at least one of the plurality of container wagons is provided with drive means for driving the container wagon to move by itself.

Thus, according to the invention, a mobile hospital system comprising a plurality of container wagons adapted to functionally operate as part of a hospital is moved to an intended area by transportation means including tractors and helicopters so as to be able to set up a comprehensive hospital by connecting the plurality of container wagons on site. Each of the container wagons can be connected to a water supply means with ease by way of a piping kit and flexible pipes. Each of the container wagons can be connected to a power generation means by means of wires and cables. Then, each of the container wagons is supplied with power for lighting and driving medical instruments and also with drinking water and water to be used for medical treatments.

Additionally, wards equipped with beds are arranged for patients and accommodations are provided for the medical staff so that the mobile hospital system may remain on site for a prolonged period of time and operate to provide medical care comparable to a large hospital to eliminate the need of transporting heavily injured patients to remote hospitals.

When a certain period of time has elapsed from the disaster and the mobile hospital system is no longer needed, it can be disassembled with ease by disconnecting the water supply pipes and the electric wires to move to some other area, which may be a storage area.

DETAILED DESCRIPTION OF THE PREFERRED EMBODIMENTS

Figure 1:
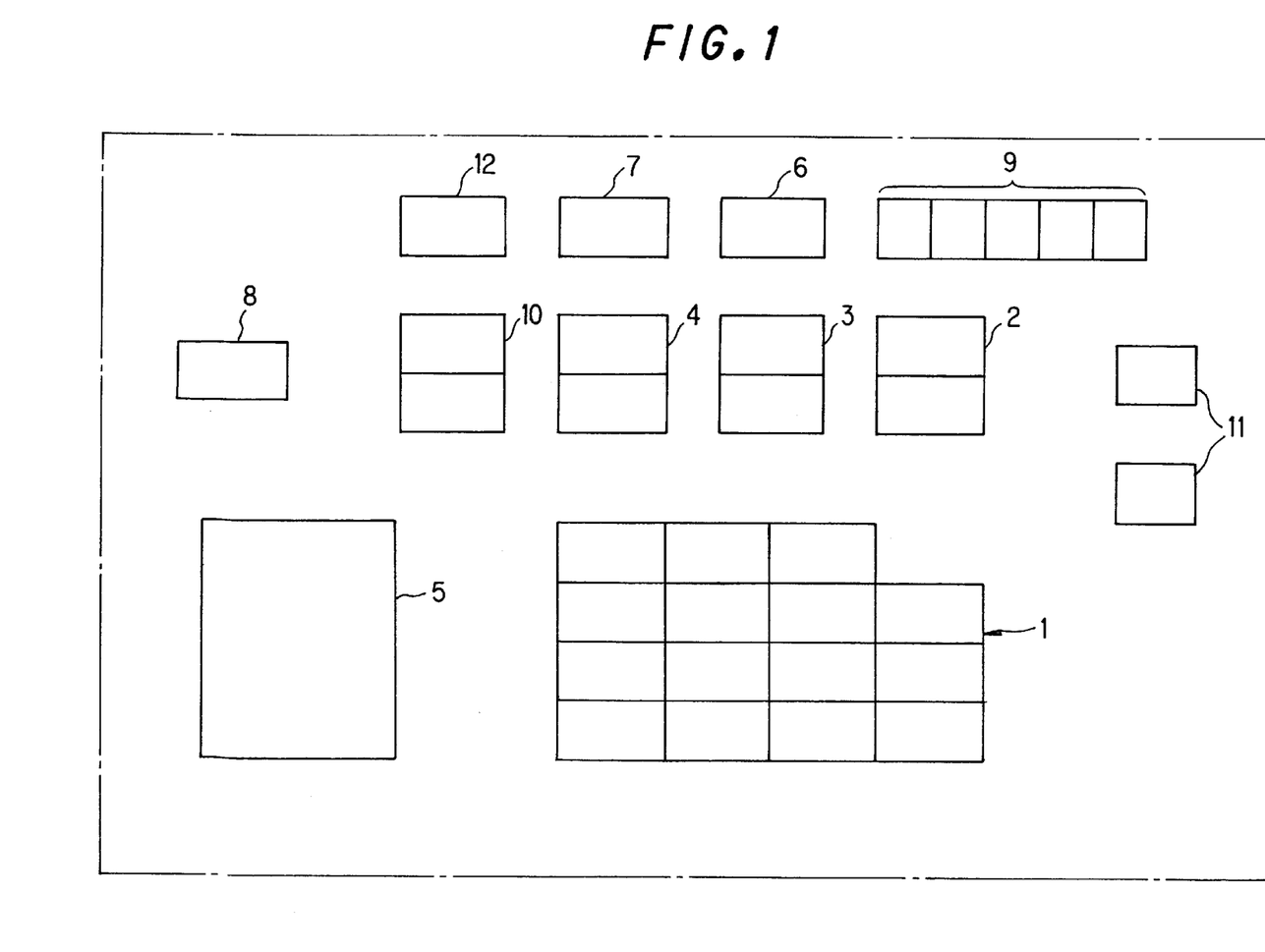
FIG. 1 is a schematic plan view of the components of a first embodiment of a mobile hospital system according to the invention, showing a possible positional arrangement for them.

The invention will be described by referring to the accompanying drawings that illustrate preferred embodiments of the invention. FIG. 1 is a schematic plan view the components of a first embodiment of mobile hospital system according to the invention, showing a possible positional arrangement that can be used for them in an area of about 100 m square located close to the region hit by earthquakes.

Referring to FIG. 1, the mobile hospital system comprises a hospital system 1 realized by connecting a plurality of container wagons that can be moved by means of tractors, a water supply wagon 2 for supplying drinking water and water necessary for medical treatments, a power generation wagon 3 carrying one or more electric generators, a fuel supply wagon 4 for supplying light oil to the power generation wagon 3 as fuel, a first aid tent 5, an incinerator wagon 6, a water purifier wagon 7, a waste water treatment wage 12 for treating waste water until it shows a quality level good for discharging it as sink water, a warehouse wagon 8 for storing tools, ambulance wagons 11 and a liquefied petroleum gas (LPG) container wagon 10. Thus, it is equipped with facilities necessary for providing medical care to the wounded including those necessary for conducting surgical operations on and accommodating the heavily wounded. Any of the power generation wagon 3, the incinerator wagon 6, the water purifier wagon 7, the warehouse wagon 8 and the LPG container wagon 10 may be moved to any desired spot by means of a tractor 9.

Figure 2:
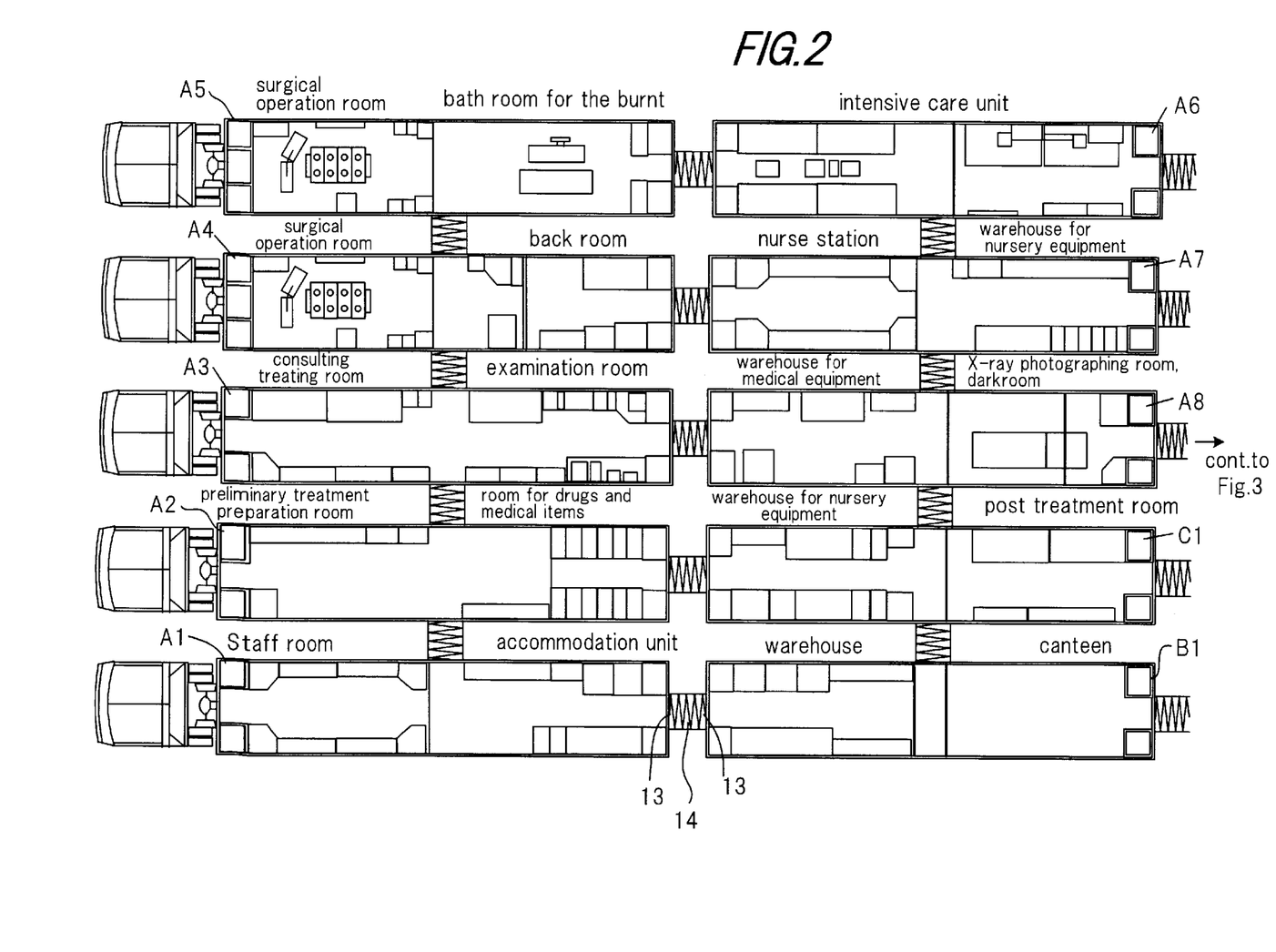
FIG. 2 is a schematic plan view of a first group of the container wagons of the first embodiment, showing a possible arrangement for connecting the illustrated wagons on site.
Figure 3:
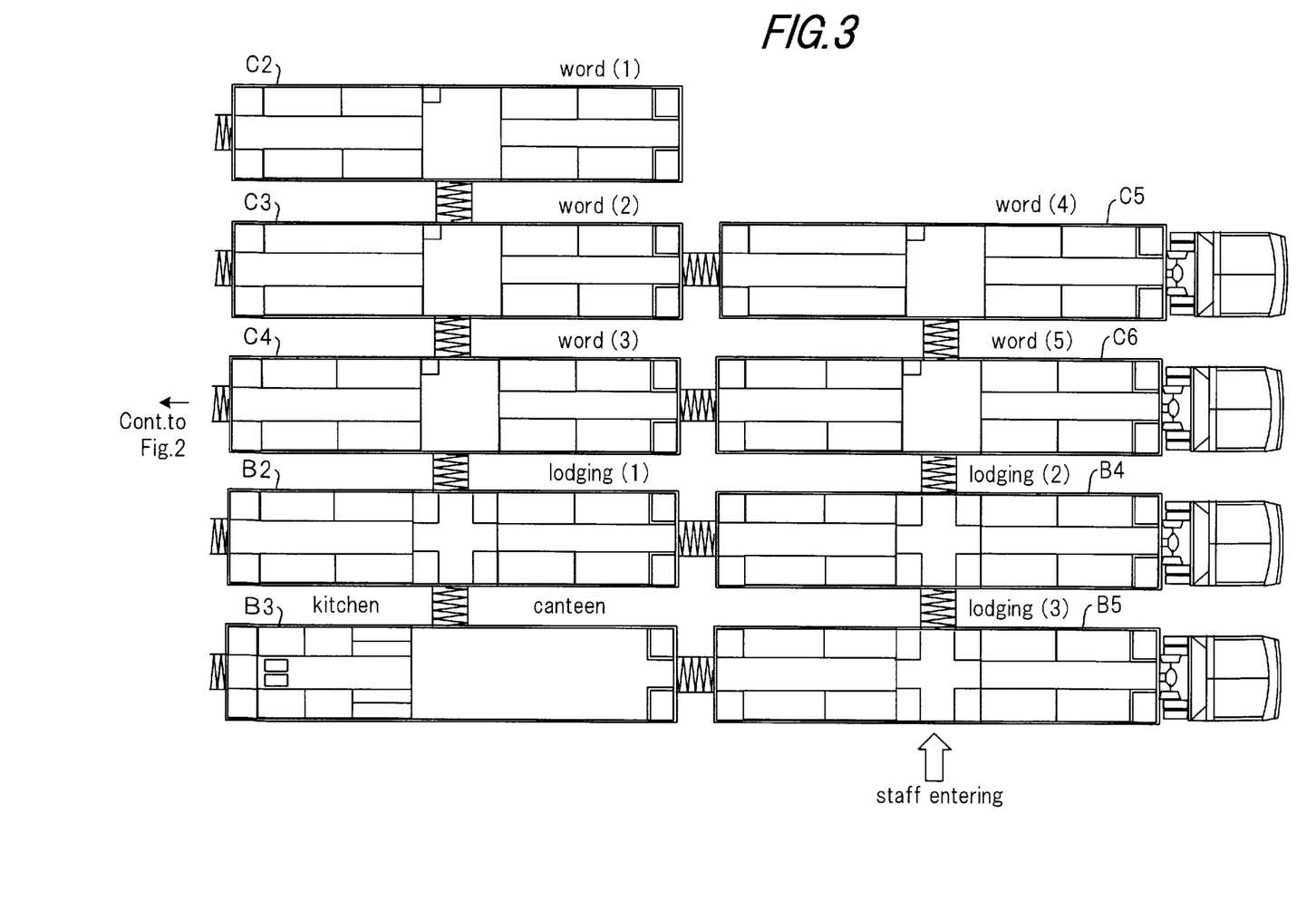
FIG. 3 is a schematic plan view of a second group of the container wagons of the first embodiment, also showing a possible arrangement for connecting the illustrated wagons on site.

FIGS. 2 and 3 are schematic plan views of the container wagons of the first embodiment, showing a possible arrangement for connecting the illustrated wagons to realize a hospital system 1 on site. As seen from FIGS. 2 and 3, the hospital system 1 is realized by connecting a plurality of container wagons arranged in array and provided with respective functions of a general hospital so that the hospital system 1 may operate satisfactorily for providing medical care to the patients, including diagnoses and medical treatments.

Each of the container wagons is dimensioned as a cabinet such that it may be moved by means of a tractor, a railway locomotive (by land), a helicopter (by air), and/or a sea vessel (by sea) and provided on all or some of its lateral sides with a door (connecting opening) 13 for connecting it with another container wagon. Thus, the container wagons may be connected with each other by arranging them into a matrix. In the embodiment of FIGS. 2 and 3, a total of 19 container wagons are arranged on site. They may be classified into a group of medical facilities (denoted by symbol A), a group of ward-related facilities (denoted by symbol B) and a group of accommodation facilities (denoted by symbol C). Wore specifically, the container wagons having the following assignments.

wagon No. A1: staff room, accommodation unit wagon No. A2: preliminary treatment/preparation room, room for drugs and medical items wagon No. A3: consulting/treating room, examination room wagon No. A4: surgical operation room, back room wagon No. A5: surgical operation room, bath room for the burnt wagon No. A6: intensive care unit wagon No. A7: nurse station, warehouse for nursery equipment wagon No. A8: warehouse for medical equipment, X-ray photographing room, darkroom wagon No. C1: warehouse for nursery equipment, post treatment room wagon No. B1: warehouse, canteen wagon No. C2: ward (1)

wagon No. C3: ward (2)

wagon No. C4: ward (3)

wagon No. B2: lodging (1)

wagon No. B3: kitchen canteen wagon No. C5: ward (4)

wagon No. C6: ward (5)

wagon No. B4: lodging (2)

wagon No. B5: lodging (3)

Figure 4:
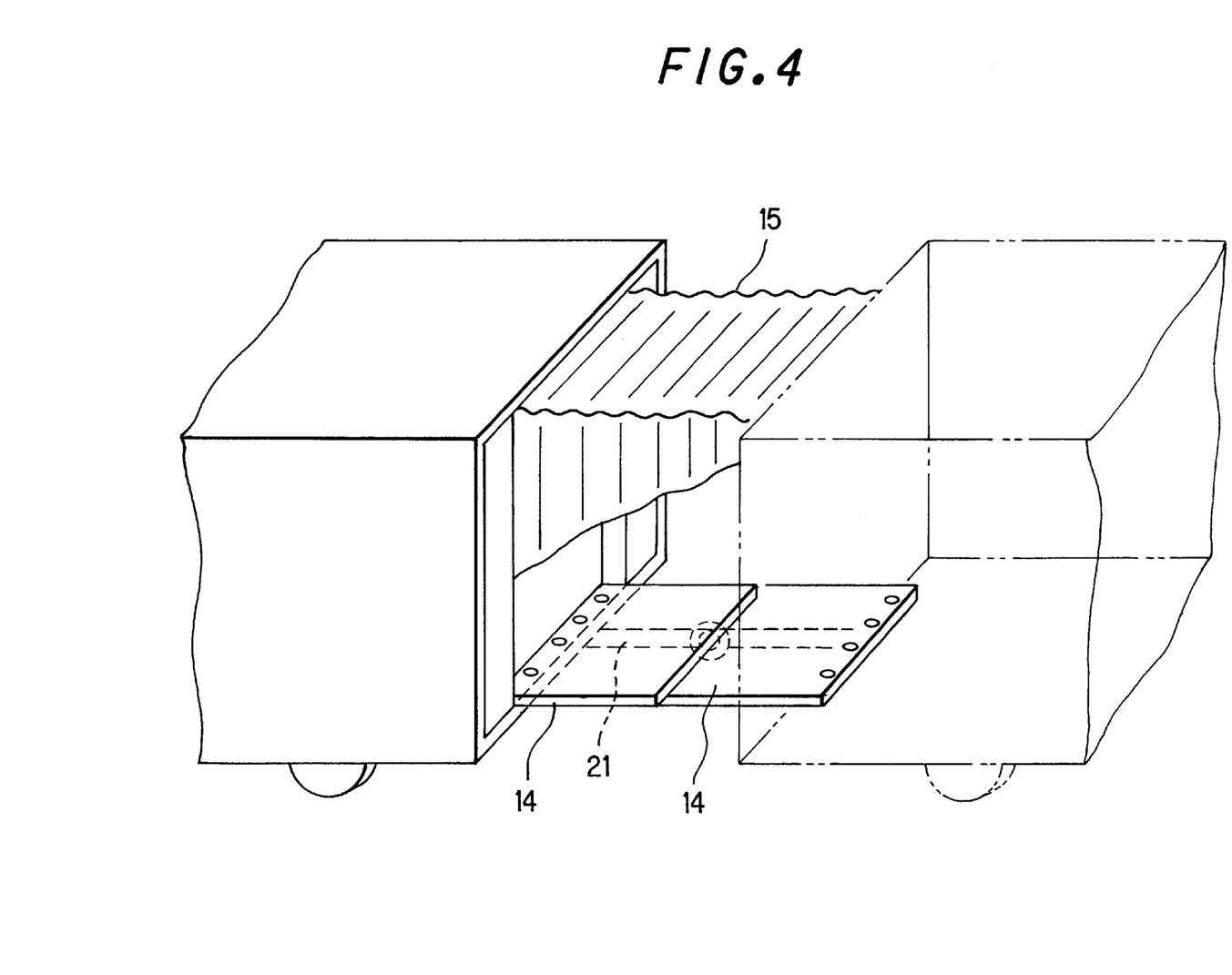
FIG. 4 is a schematic perspective view of a connecting seal and a connecting corridor that can be used for connecting a pair of container wagons.

As seen from FIG. 4, any two adjacently located container wagons are connected with each other at the oppositely disposed doors by means of a connecting rod 21 and a connecting corridor is produced by a pair of corridor members 14 secured to each other with bolts at the doors so that the container wagons are held in communication with each other by a corridor to allow people to move from one of the wagons to the other or vice versa.

The corridor members 14 may be made of a flexible material so that they may be expanded or contracted depending on the distance separating the two container wagons. Alternatively, each of the container wagons may be provided with a connecting plate member arranged at each of the four lateral sides thereof and corridor members 14 may be used to bridge oppositely disposed connecting plate members. Additionally, the corridor members 14 that are connected with each other to produce a corridor may be covered by a bellows-like connecting seal 15 which provides airtightness and shuts off ambient air particularly in the case of container wagons Nos. A1 through A8.

Now, each of the above listed container wagons will be described from the viewpoint of functional features.

A1

Container wagon A1 is used as entrance/exit for the patients entering the hospital and the patients being released from the hospital. The accommodation unit is typically provided with a lavatory, a washbasin, a mobile bed and a wheel chair so that a heavily injured patient may be moved to any of the downstream container wagons by means of the mobile bed or the wheel chair. After the necessary medical treatment, the patient will be returned to the accommodation unit. Note that only one entrance/exit is provided and located near the staff room so that the hospital environment and the entrance/exit of patients may be held under rigorous control.

The staff room is provided with clerical equipment and telecommunications equipment for communication between the mobile hospital system. It also operates as dispensary for providing the patients who are leaving the hospital with prescribed medicine.

A2

The preliminary treatment/preparation room contains a space for preparatory activities for surgical operations and for anesthesia, medical gas equipment and shelves for instruments and drugs. The room for drugs and medical items contains drugs and medical items along with other consumables, which may be delivered on request to the shelf or the storage cabinet of any of the consulting/treating room (A3), the surgical operation rooms (A4, A5), the bath room for the burnt (A5), the back room (A4), the staff room (A1) and the nurse station (A7).

A3

The examination room is equipped with instruments for blood examination, a cabinet for storing chemical agents, a cabinet for storing blood for transfusion and blood transfusion equipment. The consulting/treating room can accommodate a number of patients who have to be treated practically simultaneously and is provided with consumables including drugs and other medical items such as bandages and gauze, a shelf for instruments, a wall film projector screen, examination couches, shadow-free mobile operating lamps for local illumination, a clerical desk and chairs.

A4

The surgical operation room is provided with a universal operating table, a wall film projector screen, a patient monitor unit, a shadow-free ceiling light, an electric knife unit, medical gas equipment, shelves for instruments and drugs and an anesthesia and breathing apparatus. The adjacent back room is provided with sterilizing equipment and a shower unit for doctors.

A5

This wagon has a surgical operation room same as that of the container wagon A4 and a bath room for the bunt, which contains a bath tub for the burnt, a manually movable swivel arm and a cabinet for storing medical items. This room is used to treat burnt patients and also by heavily injured patients. The waste water of the bath room is led to a waste water treatment apparatus 12 (see FIG. 1) by way of sewer pipes.

A6

The intensive care unit (ICU) comprises four accommodation units and two bed rooms for the burnt so that the physical conditions of the patients may be monitored by the nurses in the nurse station (A7) by means of monitors.

A7

This includes a nurse station attended by nurses and provided with infusion bottles and infusion apparatus. The adjacent warehouse for nursery equipment contain nursery carts, emergency carts, artificial respirators and spare mobile beds.

A8

The X-ray photographing room contains a stationary breast photographing unit and a mobile photographing unit and the dark room contains stationary control panel for driving and controlling the photographing unit, a developing unit, a film storage cabinet and a work table. The warehouse for medical equipment contains a mobile digital projector, a gastro-examination unit and an ultrasonic diagnosis unit. Note that photographing using a contrast medium containing barium is not permitting for waste treatment considerations. Additionally, the warehouse contains two dialyzers and other major medical equipment.

B1

This wagon has a canteen and a warehouse. The medical staff and patients are served by dishes cooked in the adjacent kitchen (B3).

B2, B4, B5

The lodging are used to accommodate the medical staff (doctors, nurses and others). If the hospital is attended by 24 staff members around the clock on a two-shift basis, the accommodation includes beds, a food storage cabinet, a kitchen, a canteen, a warehouse and a laundry good for 48 persons. Each lodging wagons is provided with two shower rooms and two lavatories separated for male and female staff members.

B3

This wagon has a kitchen (for 12 cooks) and a canteen (with 12 seats) so that dishes cooked for the patients who are able to eat will be served in the canteens (B1, B3).

C1

The warehouse for nursery equipment contains mobile bath tubs, nappy supply carts, nursery carts and cabinets for storing disposable items. This wagon also has a lavatory, a laundry, a sink and a post treatment room.

C2 through C6

Each ward has compartments adapted to contain respective mobile beds (eight in total) and facilities for supplying cold and hot water and washbasins are arranged along the central gangway. Patients can take a bath and wash the hair by arranging mobile bath tubs in the ward. The patients are held in the ward with respective mobile beds so that each patient may be hospitalized on a short-term basis and moved to a remote facility once recovered to a certain level. This embodiment comprises a total of 40 beds.

Figure 5:
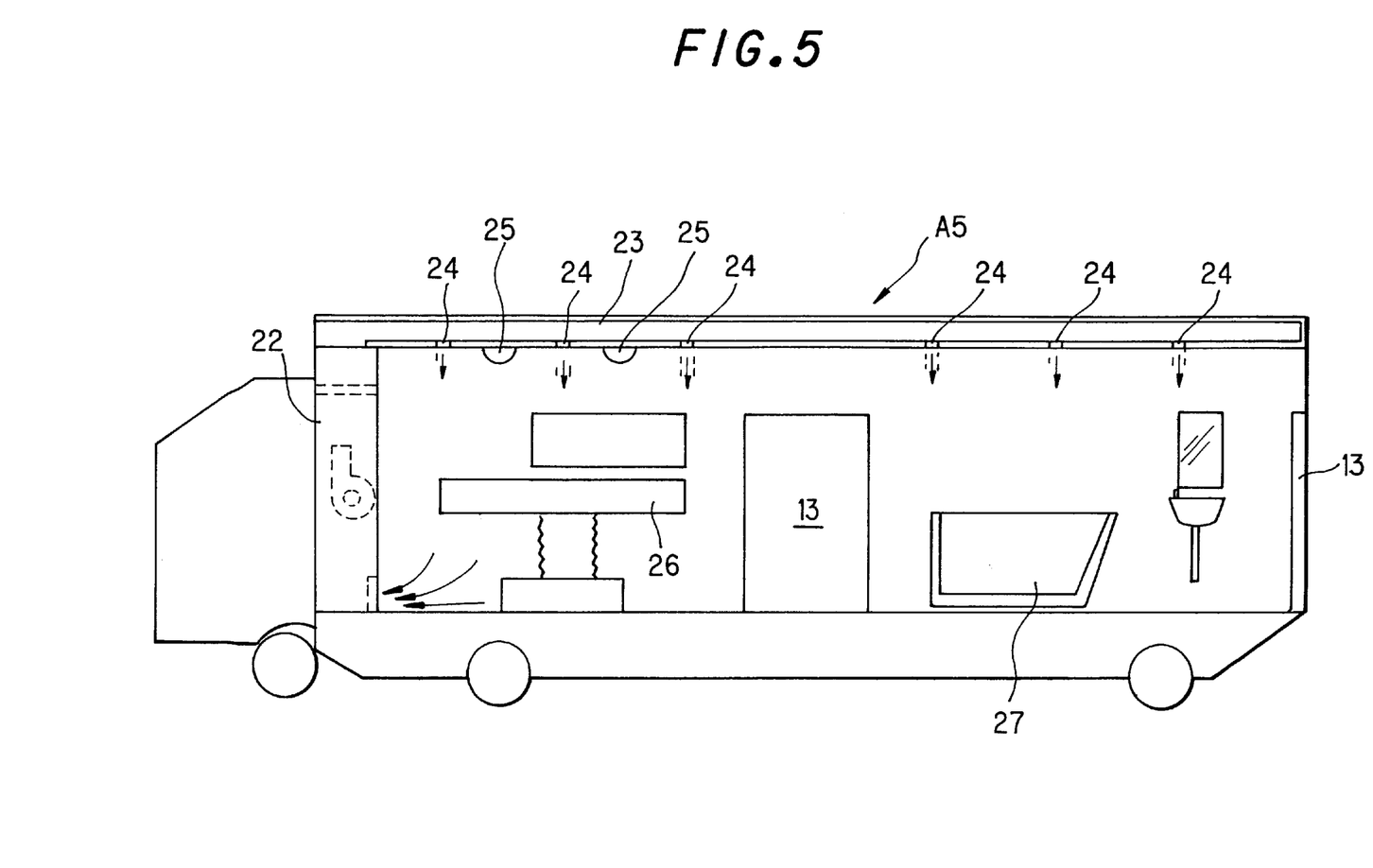
FIG. 5 is a schematic lateral view of a container wagon of FIG. 2, showing the air conditioning system mounted on the wagon.

FIG. 5 is a schematic lateral view of the container wagon A5 of FIG 2, containing a surgical operation room and a bath room for the burnt. As shown, the entire container wagon functions as a clean room by means of an air conditioning system 22 mounted on the left side of the wagon in FIG. 5. More specifically, an air duct 23 is arranged above the ceiling, which has a plurality of air blow-in holes 24 held in communication with the air duct 23, the air conditioning system 22 being adapted to draw air from the floor of the surgerical operation room, filter and sterilize it and blow in clean air back to said air duct 23 so that the inside of the container wagon is constantly cleaned by circulating air. In FIG. 5, reference numerals 25, 26 and 27 respectively denote a shadow-free lamp, an operating table and a bath tub for the burnt.

Now, the functional features of each of the annexed facilities shown in FIG. 1 will be described.

The water supply wagon 2 has two water containers having a capacity of containing a total of 10 tons, or 5 cubic meters each. If no tap water is available in the neighborhood, it collect water is collected from rivers and supplied to the water purifier wagon 7.

The water purifier wagon 7 comprises a pretreatment tank, a pair of filtering pumps, a pair of filter units, a storage tank and a pressure pump. The water temporarily stored in the pretreatment tank is fed to one of the filter units by means of the corresponding one of the filtering pumps. Where it is purified to the quality level of drinking water and then stored in the storage tank. The water stored in the storage tank is then supplied to the water supply tank in each of the container wagons by means of the pressure pump. The paired filtering pumps and filter units are driven alternately.

The incinerator wagon 6 is used to burn general wastes and medical wastes. More specifically, wastes are gasified by electromagnetic waves (primary treatment) and the generated gas is burnt at high temperature (about 900° C.) (secondary treatment) so that the generation of dioxin and the treatment residue will be minimal. The treatment residue will be temporarily stored and transported to a remote facility, where it is disposed as industrial waste.

The fuel supply wagon 4 stores light oil to be used in the power generation wagon and other wagons as fuel. It can typically store 5 cubic meters of light oil.

The power generation wagon 4 carries 2 generators and 2 switchboards adapted to output a 3-phase 200 V 60 Hz AC at a rate of 150 kW, which is fed to the power supply terminal of each of the wagons. Additionally, each of the medical facilities (A1 through A8) is provided with an uninterruptible power supply unit so that it is constantly supplied with a 3-phase 200 V 60 Hz AC and a 1-phase 100 V 60 Hz AC even when the power generators become inoperative. Still additionally, the operating rooms (A4, A5) and the ICU (A6) have to be supplied with power at the cost of the remaining facilities in emergency even when the generators become defunct so that they are fed with power by the uninterruptible power supply units of the remaining wagons (A1 through A3, A7, a8). Each of the wards and the accommodations are equipped with a distribution board so that it is supplied with a 3-phase 200 V 60 Hz AC and a 1-phase 100 V 60 Hz AC.

If an external stable power source is available near the mobile hospital system, the latter can be supplied with power by the external source by connecting the switch circuit arranged on the primary side of the power generation wagon to the external power source. Each of the container wagons and each of the instruments of the mobile hospital system will be grounded. Additionally, each of the container wagons is provided with an earth leakage breaker and the wagon is electrically isolated from the power source whenever an electric leakage is detected by the breaker except that, when the earth leakage breaker connected to a medical instrument whose power supply should not be interrupted detects an electric leakage, the power supply is not interrupted but the breaker issues an alarm signal to notify the user of the electric leakage.

The ambulance wags 11 are used to transfer patients to remote facilities after medically treating them on a first aid basis. Each of the ambulance wagons 11 can carry a pair of stretchers in juxtaposition and is equipped with a radio telecommunications unit and a mobile telephone set for communicating with the base station and with other wagons so that it can operate as a leading wagon when the wagons of the mobile hospital system are moving collectively on the ground.

Each of the container wagons of the mobile hospital system 1 is connected to the water supply wagon 2, the power generation wagon 3 and the water purifier wagon 7 so that it is supplied with drinking water, tap water and power. More specifically, as shown in FIG. 6, each of the container wagons is connected to the water supply wagon 2 by way of a piping kit, flexible pipes and pipe couplers (denoted by reference symbol L1 in FIG. 6) and to the power generation wagon 3 by way of wire tubes and cable racks so that the power output of the power generation wagon 3 may be fed to each of the container wagons by way of wires and cables (denoted by reference symbol L2 in FIG. 6).

Figure 6:
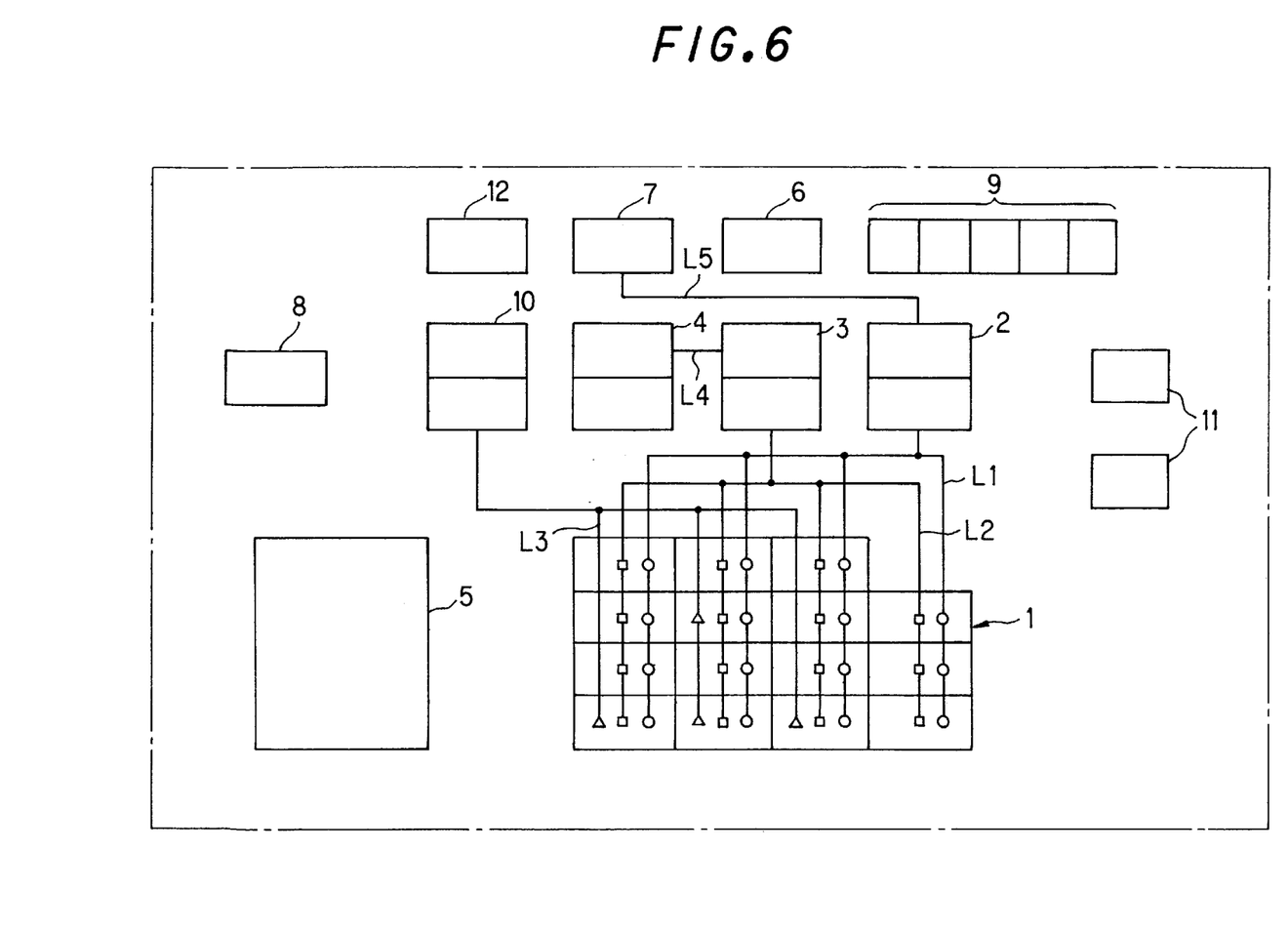
FIG. 6 is a schematic plan view similar to FIG. 1 but showing the connections of the utility systems.

Liquefied petroleum gas (LPG) is supplied from the LPG container wagon 10 to the container wagons that require the use of gas for boiling water and for cooking food, including A1, B1 and B3 respectively having a staff room, a canteen, B3 and a kitchen and B2, B4 and B5 dedicated to lodgings by way of gas pipe lines (denoted by reference symbol L3 in FIG. 6). Additionally, an oil pipe line (denoted by reference symbol L4) extends between the power generation wagon 3 and the fuel supply wagon 4 while a water pipe line (denoted by reference symbol L5) extends between the water purifier wagon 7 and the water supply wagon 2.

Each of the container wagons is provided with an air conditioning/ventilation system and fire extinguishers and each of the wagons that require the supply of water is provided with an auxiliary water tank and a pair of pressure pumps (driven alternately). Each of the wagon that consume hot water is provided with an electric boiler.

Each of the container wagons A1 through A8 that are dedicated to medical purposes has a so-called clean room structure for seizing microbes, dirt particles and smelling substances floating in the air in the inside of the wagon and the interior is processed for anti-microbe effects. Whenever necessary, it is provided with a microbe-free water supply system to be used for medical activities.

Now, the operation of the above described embodiment will be described. As long as the container wagons are not mobilized, they stay in the proper base. If a large earthquake occurred in a region of the country and all the hospitals in the region have been destructed and can no longer take care of the injured, each of the container wagons is connected to a tractor 9 and moved to the disaster-stricken region.

The container wagons are advantageously drawn to a plot of flat land having a certain extension. Typically, an athletic arena or a school yard is a preferably choice. As the container wagons arrive, they are arranged in an array by maneuvering the tractors 9 as shown in FIGS. 1 through 3. If the site is not flat, the auxiliary legs arranged at the bottom of each of the container wagons are used to finely regulate the height of the wagon so that the wagons are found flush with each other.

Then, any two adjacently located container wagons are connected by way of the oppositely disposed doors and the corridor members 14 and the produced corridor is surrounded by the bellows-like connecting seal 15. Then, the utility-related pipes and wires of the wagons including the water supply pipes and the electric wires are connected so that the container wagons are supplied with electricity, water and LPG. Now, the mobile hospital system is set up and ready not only for taking care of patients not only on a first aid basis but also providing a comprehensive diagnosis to each patient.

While the container wagons are moved to the destination by land by means of tractors 9 in the above description, a mobile hospital system according to the invention is not limited thereto and they may be moved by any other appropriate moving means.

If, for example, a remote island is hit by a large disaster, the container wagons cannot be moved to it by land. Then, each of the container wagons may be hung by wires, using the suspension fitting of the wagon, and transported to the destination by air typically by means of a helicopter. At least a tractor 9 will be used on the island and all the transported container wagons will be arranged in an array by maneuvering the tractor 9 in a manner as shown in FIGS. 2 and 3. Alternatively, the container wagons may be moved to the destination by sea by means of a marine vessel.

Figure 7:
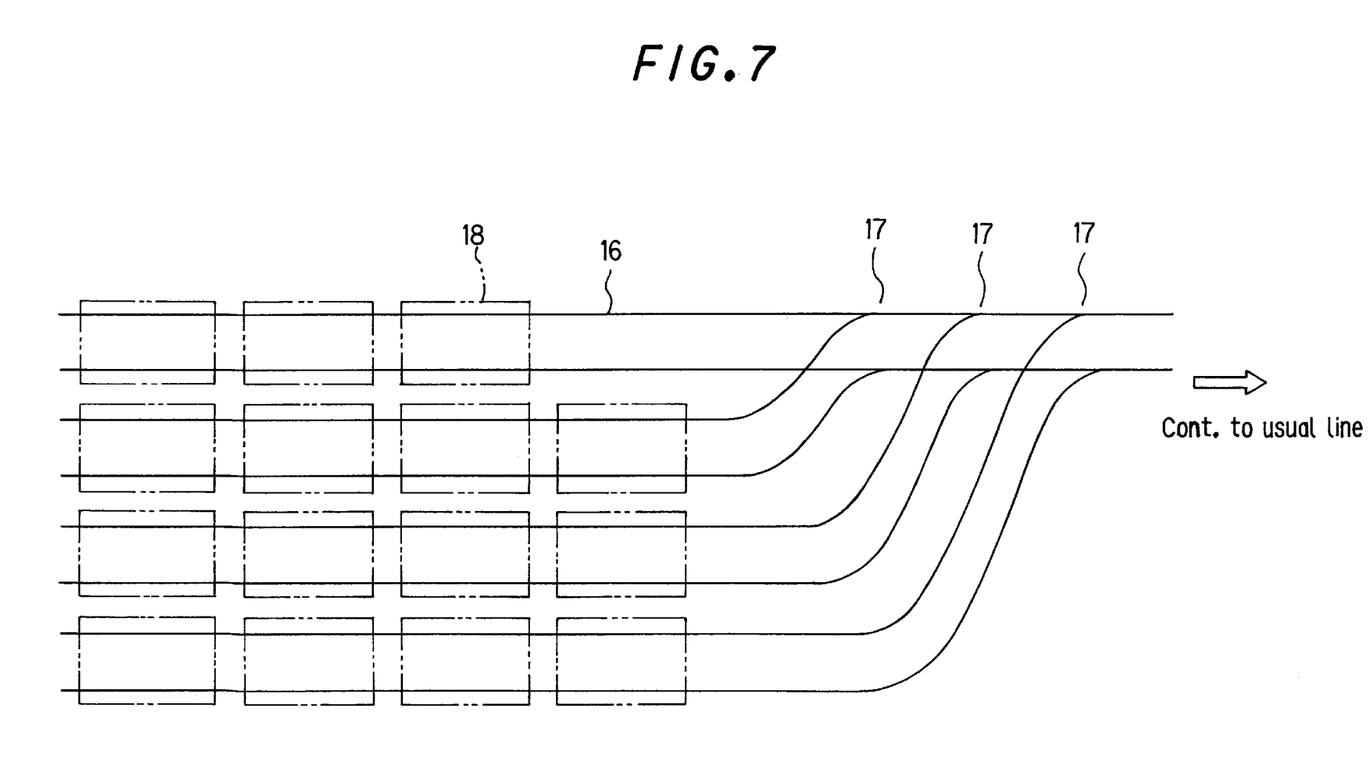
FIG. 7 is a schematic plan view of the railroads arranged for the container wagons of a mobile hospital system according to the invention.

Railroads may be used to move the container wagons to the destination. If the destination is located in a remote and isolated area where no large scale hospitals are available, rails may be laid in parallel as an extension of the proper railroad as shown in FIG. 7. Then, the container wagons 18 are moved by rail and arranged in array on the rails 16 by operating the switches 17 so that any two adjacently located container wagons 18 are connected by way of the oppositely disposed doors and the corridor members 14 and then the utility-related pipes and wires of the wagons including the water supply pipes and the electric wires are connected so that the container wagons are supplied with electricity, water and LPG to operate the mobile hospital system as described above.

Figure 8:
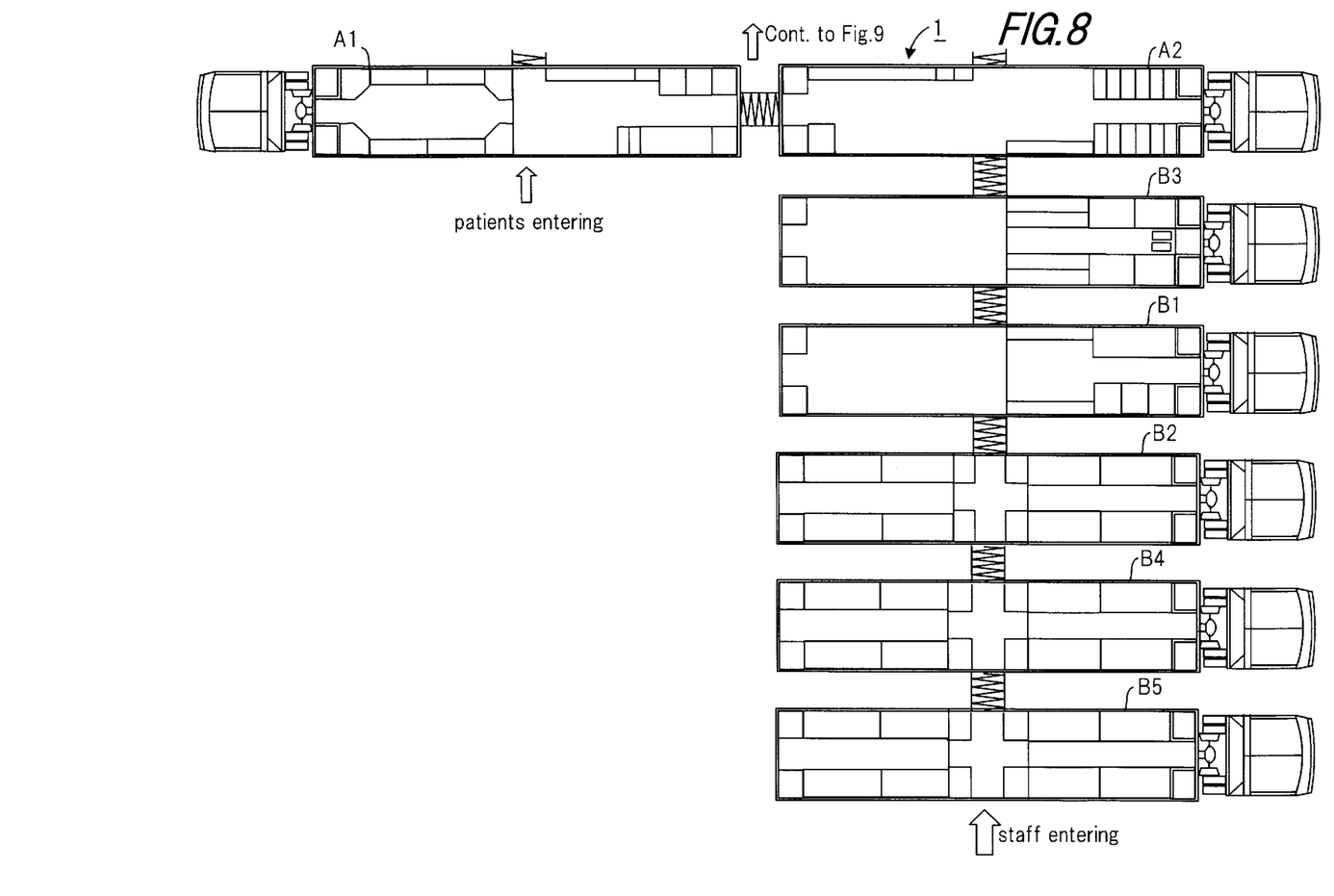
FIG. 8 is a schematic plan view of a first group of the container wagons of a second embodiment of a mobile hospital system according to the invention, showing a possible arrangement for connecting the illustrated wagons on site.
Figure 9:
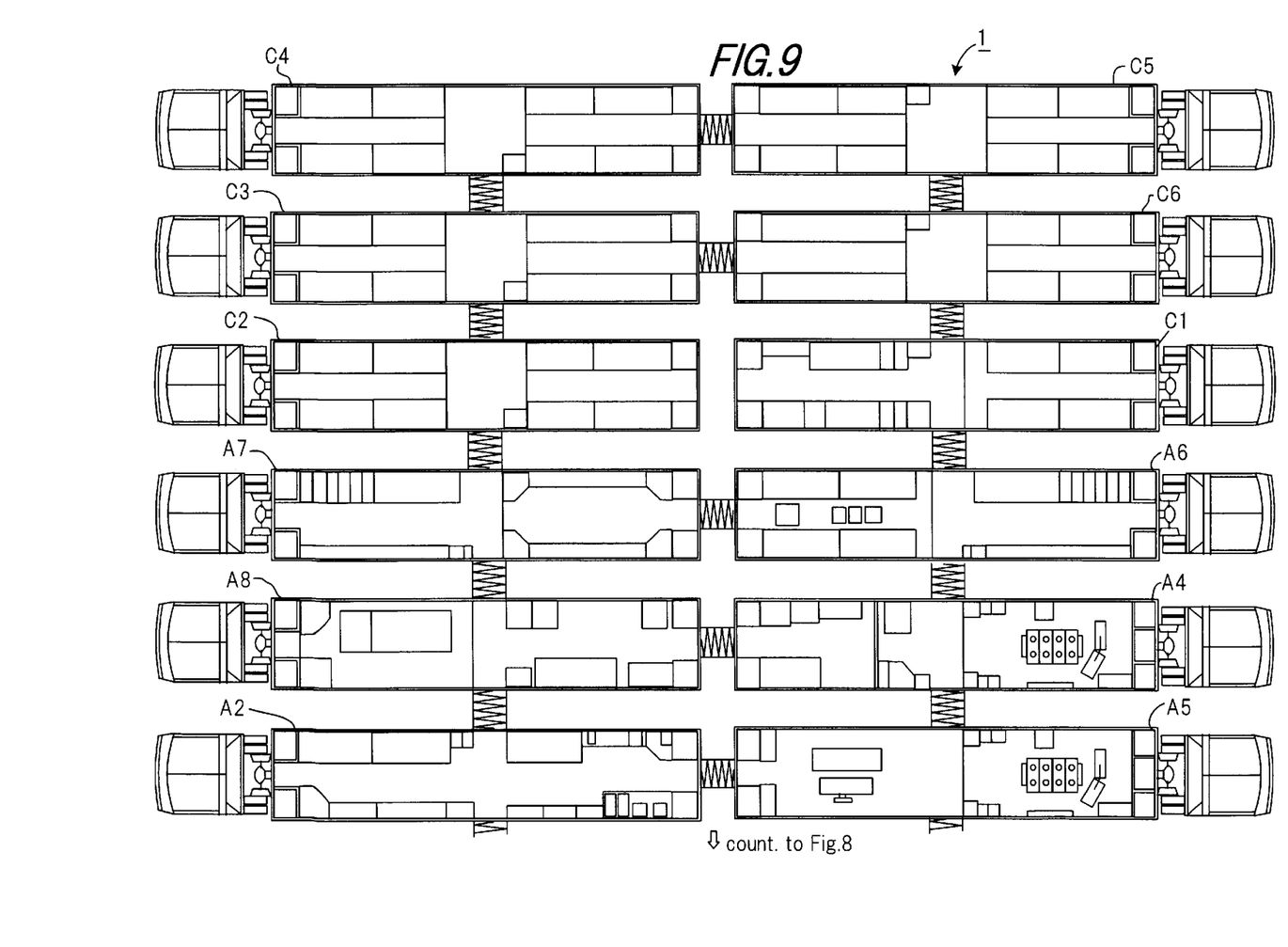
FIG. 9 is a schematic plan view of a second group of the container wagons of the second embodiment, also showing a possible arrangement for connecting the illustrated wagons on site.

FIGS. 8 and 9 are schematic plan views of the container wagons of the second embodiment of the invention, showing a possible arrangement for connecting the illustrated wagons in a manner different from the first embodiment to realize a hospital system 1' on site. Since the container wagons are identical with their respective counterparts of the first embodiment, they will not be described here any further. This arrangement is particularly advantageous when the site is dimensionally limited in the lateral direction. It is also advantageous because the tractors 9 do not have to be separated from the respective container wagons for setting up the hospital system. However, it is accompanied by the disadvantage that the container wagons are less communicable if compared with the arrangement of FIGS. 2 and 3.

Figure 10:
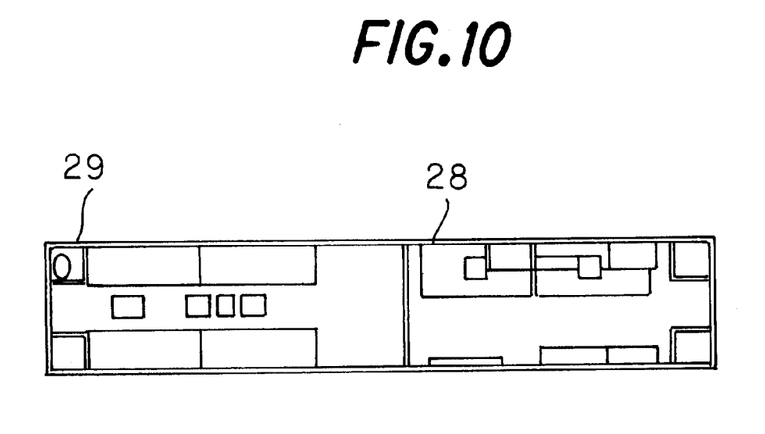
FIG. 10 is a schematic plane view of an automotive container wagon.

FIG. 10 illustrates an automotive container wagon. As shown, the automotive container wagon 28 has a driver's seat 29 and is equipped with an engine, drive wheels and other components necessary for an automobile so that the container wagon is elf-propelled. Thus, such a container wagon 28 may move to the destination without using a tractor. Additionally, if it is transported by air and/or sea, no tractor will be required to move it in the area of destination so that the overall efficiency will be significantly improved. Still additionally, if the intermediary container wagons (such as A6 and A7) in FIGS. 2 and 3 that have to be ultimately separated from the respective tractors are made automotive, their positions may be finely regulated with ease to reduce the effort required to connect the container wagons.

Thus, the above described embodiment of mobile hospital system comprising a predetermined number of container wagons can be moved to the destination hit by a large natural disaster in an easy and effective way and a mobile hospital system can be set up by connecting them on site to provide comprehensive medical services comparable to a large scale hospital including first aid services, medical treatments, surgical operations and hospitalization and nursery services in order to meet various requirements on the part of patients.

Additionally, since the mobile hospital system comprises wards for accommodating patients and lodgings for the medical staff, it can operates satisfactorily for a prolonged period of time to make it particularly adapted to large natural disasters and prolonged military disputes.

Still additionally, a mobile hospital system 1 is set up by appropriately connecting container wagons having doors 13 on the four lateral sides so that the arrangement of the container wagons can be determined appropriately depending on the topography of the site to make the system highly flexible in terms of positional arrangement. Finally, the medical facilities (A1 through A8) have a so-called clean room structure so that any secondary infections due to microbes floating in the air can be effectively prevented from taking place. The corridors connecting the container wagons and realized by corridor members 14 are isolated from ambient air so that no germs may enter from the outside.

The present invention is not limited to the above embodiments, which may be altered and modified appropriately depending on the circumstances of the disaster-stricken region where the mobile hospital system is used. For example, in a case where the disaster is of a relatively small scale and not many wards are required, less container wagons may be used than those shown in FIGS. 2 and 3. However, in a case where the disaster is very large, on the other hand, more surgical operation rooms and wards will have to be installed on site.

ADVANTAGES OF THE INVENTION

As describe din detail above, a mobile hospital system according to the invention comprises a plurality of container wagons adapted to functionally operate as part of a hospital and be moved appropriately by transportation means including tractors and helicopters so as to be able to set up a comprehensive hospital by connecting the plurality of container wagons on site in a region hit by a natural disaster or a harsh military dispute so that it can provide relevant medical services to the patients including casualties. Additionally, a mobile hospital system according to the invention is provided with one or more surgical operation rooms and intensive care units so that heavily damaged patients can be properly treated without moving to a remote hospital.

Still additionally, a mobile hospital system according to the invention is also provided with wards for accommodating patients and lodgings for the medical staff, if can operate satisfactorily for a prolonged period of time to make it particularly adapted to the patients who need long medical care.

What is claimed is:

1. A mobile hospital system comprising a plurality of container wagons adapted to functionally operate as part of hospital and be moved appropriately by transportation means so as to be able to set up a comprehensive hospital by connecting said plurality of container wagons on site, some of said container wagons being provided with a water supply means for supplying water from a water supply wagon, a power generation means for supplying fuel oils to said power generation means and a wagon mounted incinerator for burning the wastes produced from said container wagons.

2. A mobile hospital system according to claim 1, wherein each of said plurality of container wagons has a connecting opening at least on one of its four lateral sides so that any adjacently located two of said container wagons may be held in communication with each other by way of their respective connecting openings.

3. A mobile hospital system according to claim 1, wherein said plurality of container wagons include at least a consulting room for treatments by a doctor, a surgical operation room for surgical operations and a medical instrument room equipped with various medical instruments.

4. A mobile hospital system according to claim 3, wherein said surgical operation room is provided with an air cleaning apparatus for keeping said surgical operation room as clean room.

5. A mobile hospital system according to claim 4, wherein said surgical operation room has an air duct arranged above the ceiling of the room and the ceiling has a plurality of air blow-in holes held in communication with said air duct, said air cleaning apparatus being adapted to draw air from a lower portion of the surgerical operation room and blow in clean air to said air duct.

6. A mobile hospital system according to claim 3, wherein said plurality of container wagons further include a ward, a canteen, a staff room and staff bed room.

7. A mobile hospital system according to claim 1, wherein at least one of said container wagons is airtightly sealed and isolated from ambient air.

8. A mobile hospital system according to claim 1, further comprising a water purifying apparatus for purifying natural water into a quality level of suitable for drinking water.

9. A mobile hospital system according to claim 1, wherein the transportation means comprises rails aid sequentially in an intended area of operation for railroads and said container wagons are moved to the set up said hospital system.

10. A mobile hospital system according to claim 1, wherein at least one of said plurality of container wagons is provided with drive means.

* * * * *